United States Patent
Van Hemelryck et al.

(10) Patent No.: US 10,189,921 B2
(45) Date of Patent: Jan. 29, 2019

(54) RADICAL POLYMERISATION OF ETHYLENE INITIATED BY A COUPLE OF ORGANIC PEROXIDES WITH HIGH PRODUCTIVITY

(71) Applicant: Arkema France, Colombes (FR)

(72) Inventors: Bruno Van Hemelryck, Chaponost (FR); Serge Hub, Villeurbanne (FR); Christian Laurichesse, Lons (FR); Anne Berson, Laroin (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/763,152

(22) PCT Filed: Sep. 29, 2016

(86) PCT No.: PCT/FR2016/052470
§ 371 (c)(1),
(2) Date: Mar. 26, 2018

(87) PCT Pub. No.: WO2017/055748
PCT Pub. Date: Apr. 6, 2017

(65) Prior Publication Data
US 2018/0273660 A1  Sep. 27, 2018

(30) Foreign Application Priority Data
Sep. 29, 2015  (FR) ...................... 15 59145

(51) Int. Cl.
*C08F 110/02* (2006.01)
*C08F 2/38* (2006.01)
*C08F 4/38* (2006.01)

(52) U.S. Cl.
CPC ................. *C08F 110/02* (2013.01)

(58) Field of Classification Search
CPC combination set(s) only.
See application file for complete search history.

(56) References Cited

U.S. PATENT DOCUMENTS 3,706,818 A * 12/1972 Mageli ............. C07F 9/08
  525/273
3,952,041 A * 4/1976 D'Angelo et al. .... C07C 409/22
  560/302

FOREIGN PATENT DOCUMENTS

| EP | 0 259 537 A2 * | 2/1987 | ............... C08F 4/00 |
| EP | 0 259 537 | 3/1988 | |
| WO | WO-2012/107689 | 8/2012 | |
| WO | WO 2012/107689 A1 * | 8/2012 | ............. C08F 10/02 |

OTHER PUBLICATIONS

International Search Report dated Jan. 12, 2017 for PCT/FR2016/052470.
Sergeta et al., "Peroxide Initiators of Ethylene Polymerization under High Pressures," 1967, Chemical Abstracts Service Database, Accession No. 11761.

* cited by examiner

*Primary Examiner* — Robert D. Harlan
(74) *Attorney, Agent, or Firm* — NK Patent Law

(57) ABSTRACT

The invention relates to a process for manufacturing polyethylene or an ethylene copolymer, comprising a step of radical polymerization or copolymerization of ethylene in the presence:
  of a first peroxide polymerization initiator chosen from the diperketal peroxide compounds of formula:

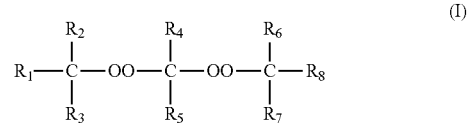

in which the $R_1$, $R_2$, $R_3$, $R_6$, $R_7$ and $R_8$ groups consist of substituted or unsubstituted, linear, branched or cyclic C1-C10 alkyl groups,
of a second initiator, other than said first initiator, also consisting of a diperketal peroxide of formula (I).

18 Claims, No Drawings

RADICAL POLYMERISATION OF ETHYLENE INITIATED BY A COUPLE OF ORGANIC PEROXIDES WITH HIGH PRODUCTIVITY

CROSS-REFERENCE TO RELATED APPLICATIONS

This application is a U.S. National Stage application of International Application No. PCT/FR2016/052470, filed Sep. 29, 2016, which claims the benefit of French Application No. 1559145, filed Sep. 29, 2015.

FIELD OF THE INVENTION

The present invention relates to a process for manufacturing polyethylene or an ethylene copolymer by high-pressure polymerization (autoclave or tubular) in the presence of a specific pair of peroxide polymerization initiators in a wide temperature range.

PRIOR ART

Low-density polyethylenes and ethylene copolymers are generally manufactured in an autoclave or tubular reactor under very high pressure, by continuous introduction of ethylene, of one or more optional comonomers and of one or more organic peroxide initiators generally diluted in an organic solvent. The pressure inside the reactor is generally between 500 and 5000 bar. The temperature during the initiation of the reaction is generally between 80 and 250° C. (degrees Celsius). The maximum reaction temperature is generally between 120 and 350° C.

The degree of conversion into polymer generally obtained with this type of process is of the order of 15% to 25%. Similarly, the productivity of such a process, expressed in grams of polyethylene produced per gram of peroxide initiator used, is generally between 1000 and 3000 g/g, and more generally less than 2500 g/g.

The search for gains in productivity and therefore cost is a constant preoccupation of polyethylene producers. There is a need for a polyethylene manufacturing process which has a high productivity while at the same time retaining an advantageous degree of conversion into polymer.

A process for polymerizing ethylene in the presence of a 2,2 bis-(tertiary butyl peroxy)butane initiator is known from document U.S. Pat. No. 2,650,913, but this initiator results in a low productivity (cf. example 1 of that document and test 3 below).

Also known is document FR 2946653 which discloses 2,2-di(t-amylperoxy)propane, but the latter is absolutely not used as an initiator.

In addition, documents US 2008/0226891, EP 0273090 and EP 0259537 are known, which disclose the use of 2,2-di(t-amyl peroxy)butane, but the latter is used for the manufacture of polymers that are very distinct from ethylene polymers or ethylene copolymers.

Finally, document EP 2673307 is known, filed in the name of the applicant, in which it has been shown that certain organic peroxides of the diperketal type made it possible to increase the productivity of the process to values greater than 3000 g/g for a particular initiation temperature range of between 150 and 200° C. This document illustrates, through the examples therein, the particular benefit of 2,2-di(tert-amylperoxy)butane (diluted to 50% in isododecane, known in the commercial form under the name Luperox® 520M50) as high-productivity initiator for LDPE (low-density polyethylene).

The abovementioned peroxide initiator is satisfactory since it improves productivity and the search for gains in productivity is a major goal for polyethylene resin producers.

Nonetheless, it is desirable to propose an even greater improvement in productivity.

SUMMARY OF THE INVENTION

Unlike what could have been expected by those skilled in the art, the applicant has surprisingly discovered that the use of a pair of diperketal organic peroxides of formula

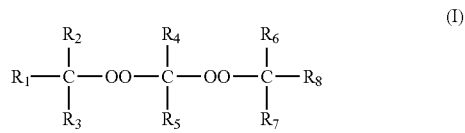

the groups R essentially consisting of C1-C6 alkyl groups, these two peroxides having a one minute half-life temperature of between 150° C. and 185° C., made it possible to reduce the specific consumption (mass of polymer produced per gram of peroxides injected) in terms of peroxide used, in the initiation temperature range of 140° C.-200° C.

The possibility emerges therefrom of obtaining productivities greater than or equal to 3000 g/g for an initiation temperature range of between 140° C. and 200° C. conventionally used for this type of process, and to increase the productivity at a high reaction temperature (polymerization temperature) of between 200° C. and 290° C. for a better thermal initiation progression, that is to say a better productivity with peroxides making it possible to reach very high temperatures ($T_{max}$=maximum temperature reached by the polymerization exotherm) typically 295-305° C., such as with di-tert-butyl peroxide.

Thus, the present invention relates to a process for manufacturing polyethylene or an ethylene copolymer, comprising a step of radical polymerization or copolymerization of ethylene in the presence:

of a first peroxide polymerization initiator chosen from the diperketal peroxide compounds of formula:

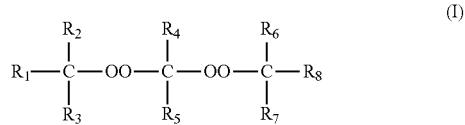

in which the $R_1$, $R_2$, $R_3$, $R_6$, $R_7$ and $R_8$ groups consist of substituted or unsubstituted, linear, branched or cyclic C1-C10 alkyl groups, of a second initiator, other than said first initiator, also consisting of a diperketal peroxide of formula (I).

In particular, the present invention relates to a process for manufacturing polyethylene or an ethylene copolymer by continuous introduction of ethylene and optional comonomer(s) into an autoclave or tubular reactor, comprising a step of radical polymerization or copolymerization of the ethylene at an initiation temperature ranging from 140° C. to 200° C., at a pressure ranging from 1200 to 3000 bar, in the presence of a first peroxide polymerization initiator chosen from diperketal peroxides of formula

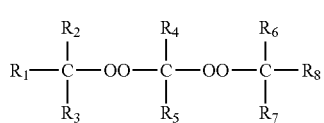

in which the $R_1$, $R_2$, $R_3$, $R_6$, $R_7$ and $R_8$ groups consist of C1-C6 alkyl groups, characterized in that a second initiator, also consisting of a diperketal peroxide of formula (I), is present during the abovementioned step, the first and second peroxides, forming a mixture of peroxides, having a one minute half-life temperature of between 150° C. and 185° C. as measured in n-dodecane at a concentration of 0.1 mol per liter (mol.l$^{-1}$) by means of a differential scanning calorimetry (DSC) curve.

The half-life temperature may be simply determined from DSC data which serve to characterize the thermal stability of the peroxides in question. Said one minute half-life temperature is measured in n-dodecane at a concentration of 0.1 mol per liter (mol.l$^{-1}$) by means of a differential scanning calorimetry (DSC) curve.

The thermokinetic curve of the decomposition recorded using this technique makes it possible to obtain the kinetic parameters relating to the thermal decomposition of unstable substances according to a decomposition equation of Arrhenius type.

In the case of a treatment according to kinetics of order n, the three parameters $k_0$ (pre-exponential factor), $E_a$ (activation energy) and n (order of the decomposition reaction) are linked and optimized so as to minimize differences between the model and the experimental curve.

The half-life temperature T is the temperature at which, after the time t, the amount of thermally unstable matter remaining is equal to half of the initial amount.

It should be noted that in the remainder of this text the expression "one minute half-life temperature" is always understood in the context of a measurement carried out in n-dodecane at a concentration of 0.1 mol per liter (mol.l$^{-1}$).

The expression "C1-C10 alkyl group", preferably "C1-C6 alkyl group" means that this is a substituted or unsubstituted, linear, branched or cyclic alkane-derived group comprising at least one (1) carbon atom and up to ten (10), preferably up to six (6) carbon atoms. For unbranched structures, this conventionally refers, for example, to methyl, ethyl, n-propyl, n-butyl, n-pentyl or n-hexyl groups.

According to one embodiment, the invention is moreover particularly improved when the one minute half-life temperature is between 160° C. and 170° C. as measured in n-dodecane at a concentration of 0.1 mol per liter (mol.l$^{-1}$).

Preferably, the one minute half-life temperature of said first initiator is between 140° C. and 180° C., preferably between 150° C. and 170° C., and even more preferentially between 155° C. and 165° C.

Preferably, the one minute half-life temperature of said second initiator is between 150° C. and 185° C., preferably between 155° C. and 175° C., and even more preferentially between 160° C. and 170° C.

Thus, the applicant tested 1,1-di(tert-amyl peroxy)cyclohexane (Luperox® 531M60), 1,1-di(tert-butylperoxy)-3,3,5-trimethylcyclohexane (Luperox® 231M50) and 1,1-di(tert-butylperoxy)cyclohexane (Luperox® 331M50) which have one minute half-life temperatures of 150° C., 153° C. and 155° C., respectively. The results of combining one of these peroxides with, for example, 2,2-(di-tert-amylperoxy)butane (Luperox® 520M50) are good—a productivity "booster" effect is clearly observed—but not as good as when the two combined diperketals both have a one minute half-life temperature of between 160° C. and 170° C.

It will be noted here that the three abovementioned diperketal peroxides comprise a central carbon-based ring such that, for these components, the groups $R_4$ and $R_5$ of formula (I) are linked so as to form said ring.

Similarly, it was observed by the applicant that for ethyl 3,3-di(tert-butylperoxy)butyrate (Luperox® 233M50) and ethyl 3,3-di(tert-amylperoxy)butyrate (Luperox® 533M65), having a one minute half-life temperature of 175° C. and 173° C., respectively, the combination with, for example, 2,2-(di-tert-amylperoxy)butane (Luperox® 520M50) gives good results—a productivity "booster" effect is clearly observed—but not as good as when the two combined diperketals both have a one minute half-life temperature of between 160° C. and 170° C.

Finally, it will be noted that the applicant tested the combination of n-butyl-4,4-di(tert-butylperoxy)valerate (Luperox® 230), having a one minute half-life temperature of 163° C., with 2,2-(di-tert-amylperoxy)butane (Luperox® 520M50). The results observed are satisfactory, in other words a productivity "booster" effect is observed, but the n-butyl-4,4-di(tert-butylperoxy)valerate releases a significant amount of ($CO_2$) which is liable, in an industrial application, to be counter-productive or problematic by the introduction of an inert gas with the purpose of reducing the monomeric ethylene partial pressure. Thus, generally, organic peroxides having an ester function, like Luperox® 230, are not a priori retained within the context of the present invention, not because of the lack of "booster" effect but because of their damaging release of $CO_2$.

The applicant also discovered a very significant improvement to the invention when the two organic peroxides used differ structurally from one another by a single carbon, at the two central groups $R_4$ or $R_5$. This is presented below with the pair 2,2-(di-tert-amylperoxy)butane (Luperox® 520M50) and 2,2-(di-tert-amylperoxy)propane (in all the examples below, diluted to 50% by weight in isododecane), but this efficiency relationship was confirmed in the laboratory with other diperketal organic peroxide pairs.

This particularly advantageous structural relationship between the two diperketals is established when the group $R_4$ or $R_5$ of the first initiator differs from the corresponding group, $R_4$ or $R_5$ respectively, of the second initiator, by a single carbon.

It will be noted that this small difference in molecular structure made it impossible to predict the markedly superior conversion efficiency (ability of the peroxide to initiate a certain number of polymer chains by monomer initiation reaction).

Other characteristics or embodiments of the invention are presented below:

preferably, the groups $R_4$ and $R_5$ are substituted or unsubstituted, linear, branched or cyclic C1-C10 alkyl groups, preferably substituted or unsubstituted, linear, branched or cyclic C1-C6 alkyl groups.

preferably, at least 1, preferably at least 2, preferably at least 3, preferably at least 4, preferably at least 5, preferably at least 6 of the groups $R_2$ to $R_7$ are substituted or unsubstituted, linear, branched or cyclic C1-C6 alkyl groups.

preferably, at least 1, preferably at least 2, preferably at least 3, preferably at least 4, preferably at least 5, preferably at least 6 of the groups $R_2$ to $R_7$ are linear.

preferably, at least 1, preferably at least 2, preferably at least 3, preferably at least 4, preferably at least 5, preferably at least 6 of the groups $R_2$ to $R_7$ are unsubstituted.

preferably, at least 1, preferably at least 2, preferably at least 3, preferably at least 4, preferably at least 5, preferably at least 6 of the groups $R_2$ to $R_7$ are linear and unsubstituted.

advantageously, the groups $R_2$, $R_3$, $R_6$ and $R_7$ of the two abovementioned initiators each consist of a methyl group.

preferably, the group $R_4$ consists of a methyl group.

preferably, the groups $R_2$, $R_3$, $R_4$, $R_6$ and $R_7$ each consist of a methyl group.

according to a preferred aspect of the invention, the groups $R_1$ and $R_8$ of the two abovementioned initiators each consist of a C2-05, preferably C2-C4, alkyl group.

according to another advantageous aspect of the invention, the group $R_5$ of the two abovementioned initiators represents a C1-C2 alkyl group.

according to a preferred solution afforded by the invention, the first polymerization initiator is 2,2-di(tert-amylperoxy)butane.

similarly, according to a preferred solution afforded by the invention, the second polymerization initiator is 2,2-di(tert-amylperoxy)propane.

preferably, said first polymerization initiator is 2,2-di(tert-amylperoxy)butane and said second polymerization initiator is 2,2-di(tert-amylperoxy)propane.

advantageously, the mixture/the proportion of the two diperketal peroxides/initiators has a share of the second initiator of between 2 and 50 mol % (all of the two perketal peroxides representing 100% of the mixture), preferably between 10 and 40 mol %, even more preferentially between 15 and 35 mol %.

preferably, the total proportion of said first and second initiators is between 1 and 10 000 ppm, preferably between 10 and 1000 ppm, even more preferentially between 50 and 150 ppm by weight relative to the weight of final polyethylene or ethylene copolymer.

Said first and second initiators may be added to the reaction mixture together or separately.

Said first and second initiators are preferably added together, and they preferably form a mixture of peroxides.

The polymerization or copolymerization may also be carried out in the presence of at least one additional peroxide initiator. Preferably, said at least one additional peroxide initiator is not a compound of formula (I).

In particular, said at least one additional peroxide initiator is not a diperketal according to the definition of the independent claim of the present patent application.

This additional peroxide initiator may be selected from the group consisting of: tert-butyl peroxyneodecanoate, tert-butyl peroxypivalate, tert-amyl peroxypivalate, bis(3,5,5-trimethylhexanoyl) peroxide, dilauroyl peroxide, didecanoyl peroxide, tert-amyl peroxy-2-ethylhexanoate, tert-butyl peroxy-2-ethylhexanoate, tert-butyl peroxy-3,5,5-trimethylhexanoate, tert-amyl peroxy-3,5,5 trim ethylhexanoate, tert-butyl peroxybenzoate, tert-butyl peroxyacetate, di-tert-butyl peroxide and di-tert-amyl peroxide.

The polymerization or copolymerization may be carried out in the presence of at least one additive, preferably selected from the group consisting of: antioxidants; UV protection agents; processing agents, having the function of improving the final appearance when it is used, such as fatty amides, stearic acid and the salts thereof, ethylenebis(stearamide) or fluoro polymers; antifogging agents; antiblocking agents, such as silica or talc; fillers, such as calcium carbonate, and nanofillers, such as, for example, clays; coupling agents, such as silanes; crosslinking agents, such as peroxides; antistatic agents; nucleating agents; pigments; dyes; plasticizers; fluidizers and flame-retardant additives, such as aluminum hydroxide or magnesium hydroxide.

These additives are generally used in contents of between 10 ppm and 100 000 ppm by weight relative to the weight of the final polyethylene or ethylene copolymer. In particular, the plasticizers, the fluidizers and the flame-retardant additives can reach amounts well above 10 000 ppm.

Aside from the improved productivity results, the process according to the invention moreover has a large number of advantages, a non-exhaustive list of which is given below:

ease of processing by simply adding the pair of peroxides, which can be introduced in a single formulation to the formulation/dilution of initiators;

the organic peroxides used within the context of the invention are peroxides of the same family (diperketals) and therefore have the same advantage of lower $CO_2$ production (inert gas which is detrimental to ethylene conversion by replacement effect), and a higher conversion than with peresters;

a lower specific consumption of the first diperketal peroxide used (the main one), which is not compromised by the addition of the second diperketal peroxide (optionally designated by the term "booster"); rather, the addition of the second diperketal peroxide makes it possible to reduce the amounts of the two peroxides used, by approximately 5 to 10% (compared to the use of just the first diperketal peroxide);

a compatibility with existing high-pressure polymerization technologies, in other words no adaptation of the current autoclave or tubular process or equipment is necessary to carry out the process according to the invention.

DETAILED DESCRIPTION OF THE INVENTION

The polymerization or copolymerization is carried out at a pressure ranging from 500 to 3500 bar, preferably from 500 to 3000 bar, preferably from 1200 to 3000 bar, even more preferentially from 1200 to 2600 bar.

High-pressure polymerization is generally carried out in an autoclave or tubular reactor. The reaction temperature is generally between 100° C. and 330° C., preferably between 120° C. and 300° C., and even more preferentially between 140° C. and 200° C.

When a tubular reactor is used, the mixture of ethylene and optional comonomer(s) is preferably introduced at the top of the tubular reactor. The initiator or the mixture of initiators is preferably injected by means of a high-pressure pump at the top of the reactor, after the location at which the mixture of ethylene and optional comonomer(s) is introduced.

The mixture of ethylene and optional comonomer(s) may be injected at at least one other point of the reactor, and this injection may in turn be followed by another injection of initiator or of a mixture of initiators; reference is then made to the multipoint injection technique. When the multipoint injection technique is used, the mixture is preferentially injected such that the weight ratio of the mixture injected at the reactor inlet to the whole mixture injected is between 10 and 90%.

Other processes for high-pressure tubular polymerization or copolymerization which are of use are for example those described in US2006/0149004 A1 or in US2007/0032614 A1.

It is also possible to use an autoclave reactor to carry out the high-pressure radical polymerization.

An autoclave reactor generally consists of a cylindrical reactor into which a stirrer is placed. The reactor can be separated into several zones connected to one another in series. Advantageously, the residence time in the reactor is between 30 and 120 seconds. Preferentially, the length/diameter ratio of the reactor is between 3 and 25. The ethylene alone and the optional comonomer(s) are injected into the first zone of the reactor at a temperature of between 50 and 120° C. An initiator is also injected into this first reaction zone when the reaction zone reaches a temperature of between 150 and 200° C. During the reaction, the temperature can be between 150 and 320° C., since the reaction is exothermic. If the reactor is a multizone reactor, the stream of ethylene and of optional comonomers which have not reacted and also the polymer formed then pass through the subsequent reaction zones. In each reaction zone, ethylene, optional comonomers and initiators can be injected, at an initiation temperature of between 140 and 200° C. The temperature of the zones after initiation is between 140 and 320° C. The pressure of the reactor ranges between 500 and 3500 bar, preferably between 500 and 3000 bar, preferentially from 1200 to 3000 bar, and even more preferentially from 1200 to 2600 bar.

The invention is illustrated by the following nonlimiting examples and experiments.

In the remainder of the text, in the following experiments and tests, it should be noted that a drastic distinction should be made between two scenarios. Firstly, the case of a monoperoxide initiator system and a binary mixture of combined peroxides according to the invention, and secondly, the case of a ternary mixture of peroxides, due to their distinct initiation temperature leading to different performance, and in particular to different specific consumptions.

Ternary initiation systems incorporating highly reactive peroxides such as tert-butyl peroxypivalate (known in the commercial form Luperox® 11M75) and tert-butyl peroxy-2-ethylhexanoate (known in the commercial form Luperox® 26) are thermally decomposed at a lower temperature than initiation systems of the diperketals alone type according to the invention.

It is known to those skilled in the art that such reactive peroxides are used at the cost of a higher consumption of peroxides, even if the use thereof also makes it possible to achieve different grades of resins/polymers. Consequently, the individual performance of the diperketal initiation systems tested at a starting temperature close to 180° C. on the one hand—examples 1 to 4—and peresters+perketals tested at a temperature close to 145° C. on the other hand—examples 5 to 8—cannot be compared with one another across experimental conditions, but only under the same experimental conditions.

Thus, in order to be in accordance with the invention, the results, within the context of a binary system (of peroxides) with initial temperature ~180° C. and P=1800 bar, must be as follows:

maximum temperature reached: this must (in order to be in accordance with the invention) be greater than 250° C.;

time taken to reach the maximum temperature: in order to be in accordance with the invention, less than or equal to 21 s;

conversion: in order to be in accordance with the invention, greater than 10%;

overall specific consumption of pure peroxide(s), in order to be in accordance with the invention, of less than 0.18 g of peroxide(s) consumed/kg of resin produced.

Within the context of a ternary system (of peroxides) placed at an initial temperature of 145° C., 1800 bar, the results must therefore be as follows:

maximum temperature reached: this must (in order to be in accordance with the invention) be greater than 235° C.;

time taken to reach the maximum temperature: in order to be in accordance with the invention, less than 19 s;

conversion: in order to be in accordance with the invention, greater than 11%;

overall specific consumption of pure peroxide(s), in order to be in accordance with the invention, of less than 0.32 g/kg.

For the sake of conciseness and simplicity, it should be noted that only a portion of the experiments and tests carried out by the applicant are presented here. Nonetheless, the applicant did of course carry out all the experiments and tests enabling them to define the invention as claimed both in general terms and in precise terms, and can provide this data if required.

Example 1

Example 1 enables a comparison of the polymerization kinetics of ethylene with either 2,2-(di-tert-amylperoxy)propane or 2,2-(di-tert-amylperoxy)butane (Luperox® 520M50).

In a 435 ml (milliliter) high-pressure stirred reactor of autoclave type, ethylene is injected until a pressure of 1800 bar is reached. The reactor wall temperature is then fixed at 180° C. by means of heater rods placed in the walls of the reactor. Stirring is at 1000 rpm (revolutions per minute).

The temperature of the reaction medium in the reactor is measured by means of two thermocouples.

The various streams (peroxide+heptane+propanaldehyde) are mixed upstream of the reactor at low temperature (25° C.) so as not to initiate the reaction before entering the reactor previously loaded with ethylene.

The 2,2-(di-tert-amylperoxy)propane (4.3 mg corresponding to a concentration of 2.26 molar ppm relative to the overall content of the reactor comprising an ethylene feedstock amount of 216.62 g) or else 2,2-(di-tert-amylperoxy)butane (Luperox® 520M50) (4.6 mg, i.e. 2.26 molar ppm) is diluted in heptane and propanaldehyde (0.654 gram of heptane, injection diluent solvent, and 0.502 gram of propanaldehyde, transfer agent) and injected into the reactor by means of a high-pressure pump. The polymerization is triggered as soon as the peroxide is injected at an initial temperature of 180° C. (initiation temperature).

The experiment time is 20 minutes for this uncooled reactor.

At the outlet of the reactor, the ethylene/polyethylene mixture is directly decompressed to 3 bar and the polymer is separated from the unreacted ethylene by passing it through a recovery vessel.

The amount of polymer recovered after polymerization is determined by weighing, which makes it possible to express the conversion (number of grams of resin produced per number of grams of monomer(s) involved) and the specific consumption of peroxide(s).

In this example, the following results were recorded:

For the 2,2-(di-tert-amylperoxy)propane (diluted to 50% by weight in isododecane), the following was obtained:

Maximum temperature reached: 284° C.

Time taken to reach the maximum temperature: 26 s (seconds)

Conversion: 15.84%

The specific consumption or "CS" is expressed as pure peroxide, in g/kg (grams per kilogram) of LDPE (low-density polyethylene) obtained=0.126 g/kg PE.

Amount of low-density polyethylene LDPE produced: 34.5 g

For the 2,2-(di-tert-amylperoxy)butane diluted to 50% by weight in isododecane (Luperox® 520M50), the following was obtained:

Maximum temperature reached: 256° C.

Time taken to reach the maximum temperature: 15 s

Conversion: 11.95%

CS=0.176 g/kg

Amount of LDPE produced: 26.05 g

According to this example 1, an equimolar, and consequently equi-(active oxygen), dosage of each of the two diperketals, Luperox® 520M50 and 2,2-(di-tert-amylperoxy)propane, leads to observing a greater conversion and lower specific consumption when 2,2-(di-tert-amylperoxy)propane is used instead of Luperox® 520M50.

However, the reaction kinetics with 2,2-(di-tert-amylperoxy)propane are much slower, as indicated by the time taken to reach $T_{max}$ which is increased by more than 40% which would be highly detrimental in tubular or autoclave industrial applications.

Example 2

This example is according to the invention.

This example relates to testing a mixture of 2,2-(di-tert-amylperoxy)butane (Luperox® 520M50) and 2,2-(di-tert-amylperoxy)propane.

The procedure described in example 1 is reproduced with 2,2-(di-tert-amylperoxy)butane (Luperox® 520M50), except that a proportion of approximately 30 mol % of this peroxide is replaced with 2,2-(di-tert-amylperoxy)propane.

More specifically, 1.59 molar ppm (parts per million) of Luperox® 520M50 and 0.7 molar ppm of the diperketal 2,2-(di-tert-amylperoxy)propane (molar ppm expressed as pure peroxide for each of the two perketals) are mixed, i.e. 3.2 mg of Luperox® 520M50 and 1.3 mg of 2,2-(di-tert-amylperoxy)propane.

The results observed are as follows:

Maximum temperature reached: 260° C.

Time taken to reach the maximum temperature: 19 s

Conversion: 13.13%

CS=0.159 g/kg

Amount of LDPE produced: 28.45 g

The substitution of approximately 30 mol % of Luperox® 520M50 (expressed in pure terms) by the diperketal 2,2-(di-tert-amylperoxy)propane (expressed in pure terms) makes it possible to increase the conversion by Luperox® 520M50 by approximately 2% while reaching $T_{max}$ remains rapid, which enables an improved production of approximately 9% (28.45 g instead of 26.05 g).

The Luperox® 520/2,2-(di-tert-amylperoxy)propane combination enables both a higher conversion and a specific consumption which is lower by approximately 10% than that of Luperox® 520M50 alone, without markedly delaying the peak of highest exothermicity, as observed with diperketal 2,2-(di-tert-amylperoxy)propane alone.

Example 3

This example is also according to the invention.

This example relates to testing a binary mixture with the perketal 2,2-(di-tert-amylperoxy)butane (Luperox® 520M50) and a diperketal 2,2-di(-tert-butylperoxy)butane (Luperox® 220M50).

This example demonstrates in particular the fact that all the perketals of structure (I) and of a one (1) minute half-life temperature (HLT) close to Luperox® 520M50 are not as good "boosters" of Luperox® 520M50 as the diperketal 2,2-(di-tert-amylperoxy)propane in particular, even if the "booster" effect is actually present.

The procedure described in example 1 is reproduced with 2,2-(di-tert-amylperoxy)butane (Luperox® 520M50), except that a proportion of this peroxide is replaced with 2,2-(di-tert-butylperoxy)butane (Luperox® 220M50).

More specifically, 1.52 molar ppm of Luperox® 520M50 and 0.66 molar ppm of Luperox® 220M50 are mixed to form a homogeneous mixture.

The results observed are presented hereinbelow:

Maximum temperature reached: 261° C.

Time taken to reach the maximum temperature: 21 s

Conversion: 12.1%

CS=0.163 g/kg

Amount of LDPE produced: 26.3 g

Example 4

This example of peroxide mixture is not in accordance with the invention.

This example relates to testing a binary mixture with the perester tert-butylperoxy-3,5,5-trimethylhexanoate, or Luperox® 270, (in combination with Luperox® 520M50), a poor "booster" despite a 1 minute HLT equivalent to that of the diperketal 2,2-(di-tert-amylperoxy)propane of 165° C.

The procedure described in example 1 is reproduced with 2,2-(di-tert-amylperoxy)butane (Luperox® 520M50), except that a higher molar proportion than in example 3 (approximately 47 mol %) of this peroxide Luperox® 520M50 is replaced with tert-butylperoxy-3,5,5-trimethylhexanoate (Luperox® 270), due to the peroxide monofunctionality of Luperox® 270.

More specifically, 1.49 molar ppm of Luperox® 520M50 and 1.34 molar ppm of Luperox® 270 are mixed to form a homogeneous mixture.

This synthesis shows in particular that, despite the large proportion of the peroxide tert-butylperoxy-3,5,5-trimethylhexanoate (Luperox® 270), the maximum temperature, conversion and specific consumption reached are degraded compared to the mixture with 30% of 2,2-(di-tert-amylperoxy)propane in 2,2-(di-tert-amylperoxy)butane (Luperox® 520M50) of example 2.

The results observed are noted hereinbelow:

Maximum temperature reached: 255° C.

Time taken to reach the maximum temperature: 19 s

Conversion: 11.92%

CS=0.209 g/kg

Amount of LDPE produced: 26 g

Example 5

This example of peroxide mixture is not in accordance with the invention.

This example relates to the production of LDPE according to the procedure described in example 1 reproduced with a cocktail/ternary mixture of peresters Luperox® 11M75/

Luperox® 26/Luperox® 270 (tert-butyl peroxypivalate/tert-butyl peroxy-2-ethylhexanoate/tert-butyl peroxy-3,5,5-trimethylhexanoate) in the respective targeted molar ratio of 20*/56/24, (*expressed as pure tert-butyl peroxypivalate), at two overall concentrations of peroxides, one making it possible to reach $T_{max}$ at around 240° C., the other making it possible to reach $T_{max}$ at around 250° C., with an initiation temperature of 145° C.

The tests were carried out on the same batch reactor as for example 1, loaded with ethylene at 1800 bar but with the initiation temperature regulated at 145° C. instead of 180° C. due to the presence of the reactive peresters Luperox® 11M75 (the tert-butyl peroxypivalate is diluted to 75% in isododecane) and Luperox® 26.

The results (case with $T_{max}$ at around 240° C., molar ratio of 19/57/23 as defined at the start of the example) observed are as follows:

Total ppm weight 78.36 (pure peroxides)
Maximum temperature reached: 239° C.
Time taken to reach the maximum temperature: 13.5 s
Conversion: 11%
Overall CS in pure peroxides=0.678 g/kg
Amount of LDPE produced: 24.5 g The results (case with $T_{max}$ at around 250° C., molar ratio of 20/56/24 as defined at the start of the example) observed are as follows:

Total ppm weight 126.18 (pure peroxides involved)
Maximum temperature reached: 249° C.
Time taken to reach the maximum temperature: 14.7 s
Conversion: 12.29%
Overall CS in pure peroxides=0.967 g/kg
Amount of LDPE produced: 27.7 g These polymerizations show rapid reaching times of $T_{max}$ of less than 15 seconds, conventional conversions for this equipment and this ternary peroxide 20/56/24 molar composition, but very high specific consumptions.

Example 6

This example of peroxide mixture is not in accordance with the invention.

This example relates to the production of LDPE according to the procedure described in example 1 but with a cocktail/ternary mixture of peresters and diperketal, i.e. Luperox® 11M75/Luperox® 26/Luperox® 520M50 (tert-butyl peroxypivalate/tert-butyl peroxy-2-ethylhexanoate/2,2-(di-tert-amyl)butane) in the targeted molar ratio of around 23 (pure)/65/12 (pure diperketal), at two overall concentrations of peroxides, one making it possible to reach $T_{max}$ at around 240° C., the other making it possible to reach $T_{max}$ at around 250° C., with an initiation temperature of 145° C.

The results (case with $T_{max}$ at around 240° C., molar ratio of 22/66/12 as defined at the start of the example) observed are as follows:

Total ppm weight 45.88 (pure peroxides involved)
Maximum temperature reached: 240° C.
Time taken to reach the maximum temperature: 16 s
Conversion: 14.10%
Overall CS in pure peroxides=0.325 g/kg
Amount of LDPE produced: 31.7 g The results (case with $T_{max}$ at around 250° C., molar ratio of 23/65/12 as defined at the start of the example) observed are as follows:

Total ppm weight 77.91 (pure peroxides involved)
Maximum temperature reached: 254° C.
Time taken to reach the maximum temperature: 13.5 s
Conversion: 14.91%
Overall CS in pure peroxides=0.523 g/kg
Amount of LDPE produced: 33.5 g These polymerizations carried out with a ternary peroxide mixture which has had its high-temperature peroxide Luperox® 270 replaced with the diperketal Luperox® 520 still show short times for reaching $T_{max}$ of the order of 15 seconds, but improved conversions for specific consumptions which have been virtually halved.

Example 7

This example of peroxide mixture is not in accordance with the invention.

This example relates to the production of LDPE according to the procedure described in example 1 but with a cocktail/ternary mixture of peresters and diperketal, i.e. Luperox® 11M75/Luperox® 26/diperketal 2,2-(di-tert-amylperoxy)propane in the molar ratio of 23 (pure)/65/12 (expressed in pure diperketal), at two overall concentrations of peroxides, one making it possible to reach $T_{max}$ at around 240° C., the other making it possible to reach $T_{max}$ at around 250° C., with an initiation temperature of 145° C.

The results (case with $T_{max}$ at around 240° C., molar ratio of 23/65/12 as defined at the start of the example) observed are as follows:

Total ppm weight 31.51 (pure peroxides involved)
Maximum temperature reached: 238° C.
Time taken to reach the maximum temperature: 22.7 s
Conversion: 13.44%
Overall CS in pure peroxides=0.234 g/kg
Amount of LDPE produced: 30.2 g The results (case with $T_{max}$ at around 250° C., molar ratio of 23/65/12 as defined at the start of the example) observed are as follows:

Total ppm weight 41.23 (pure peroxides involved)
Maximum temperature reached: 246° C.
Time taken to reach the maximum temperature: 20.5 s
Conversion: 14.50%
Overall CS in pure peroxides=0.284 g/kg
Amount of LDPE produced: 32.5 g These polymerizations carried out with a peroxide mixture in which the high-temperature peroxide Luperox® 270 is replaced with the diperketal 2,2-(di-tert-amylperoxy)propane still show $T_{max}$s of the same level but which are reached with a delay of at least five seconds compared to the syntheses of example 5 or else with Luperox® 520 of example 6, this being despite a good reactivity as can be seen by the degrees of conversion which are comparable to those obtained with Luperox® 520 (of example 6) and also specific consumptions which are further improved compared to those of example 6.

The diperketals according to the invention enable better conversions, especially relative to the perester Luperox® 270, but not all the diperketals react as quickly. Thus, Luperox® 520 is much quicker than the diperketal 2,2-(di-tert-amylperoxy)propane despite a very close molecular structure and 1 minute HLT decomposition temperature.

Example 8

This example of peroxide mixture is not in accordance with the invention.

This example relates to the production of LDPE according to the procedure described in example 1 but with a cocktail/ternary mixture of peresters and diperketal, i.e. Luperox® 11M75/Luperox® 26/Luperox® 220M50 in the molar ratio of 23 (pure)/64/13 (pure diperketal), at two overall concentrations of peroxides, one making it possible to reach $T_{max}$ at around 240° C., the other making it possible to reach $T_{max}$ at around 250° C., with an initiation temperature of 145° C.

The results (case with $T_{max}$ at around 240° C., molar ratio of 23/64/13 as defined at the start of the example) observed are as follows:

Total ppm weight 41.77 (pure peroxides involved)
Maximum temperature reached: 244° C.
Time taken to reach the maximum temperature: 19.2 s
Conversion: 13.81%
Overall CS in pure peroxides=0.353 g/kg
Amount of LDPE produced: 31.1 g The results (case with $T_{max}$ at around 250° C., molar ratio of 23/64/13 as defined at the start of the example) observed are as follows:

Total ppm weight 58.14 (pure peroxides involved)
Maximum temperature reached: 259° C.
Time taken to reach the maximum temperature: 18.5 s
Conversion: 15.71%
Overall CS in pure peroxides=0.434 g/kg
Amount of LDPE produced: 35.4 g These polymerizations carried out with the ternary peroxide mixture in which the high-temperature peroxide Luperox® 270 is replaced with the diperketal Luperox® 220M50 once again show the superiority, in terms of conversion and in terms of specific consumption, of using a diperketal, but as for example 7, the time taken to reach $T_{max}$ remains longer than when Luperox® 520M50 is chosen as diperketal of the ternary mixture (example 6) while the molecular structure and the 1 minute HLT of the Luperox® 220M50 are, yet again, close to those of Luperox® 520M50.

According to examples 5, 6 and 7, it appears that the diperketal 2,2-(di-tert-amylperoxy)propane does not make it possible to replace the customary Luperox® 270 due to too large a shift in the $T_{max}$, which goes from approximately 15 seconds to more than 20 seconds, despite a specific consumption which has overall decreased by approximately 65%. Only the Luperox® 520M50 makes it possible to substitute the perester Luperox® 270 with benefits both for the conversion and with a still considerable decrease of approximately 50% of the specific consumption of peroxides in the ternary cocktail, without degrading the kinetics. However, the applicant thus shows, by example 7, that the use of the diperketal 2,2-(di-tert-amylperoxy)propane as the only diperketal for the high reaction temperature range of 140-290° C. is not possible and that the invention should preferably comprise a majority of Luperox® 520M50 in order to enable optimal productivity (high conversion in a short reaction time).

Example 9

Example of mixture of peroxides according to the invention, used in a cocktail of initiators.

A polymerization of LDPE was carried out according to the procedure described in example 1, but based on a cocktail of initiators Luperox® 11M75/Luperox® 26/Luperox® 520M50 (tert-butyl peroxypivalate/tert-butyl peroxy-2-ethylhexanoate/diperketal 2,2-(di-tert-amylperoxy)butane) in order to compare it to a polymerization carried out on the basis of the same initiators but for which a portion of the Luperox® 520M50 has been replaced with 2,2-(di-tert-amylperoxy)propane.

Example 9a

For reference for this example, the LDPE production was carried out according to the procedure described in example 1 but with a cocktail/ternary mixture of peresters and diperketal, specifically Luperox® 11M75/Luperox® 26/Luperox® 520M50 (tert-butyl peroxypivalate/tert-butyl peroxy-2-ethylhexanoate/diperketal 2,2-(di-tert-amylperoxy) butane) in the molar ratio of 23.1 (pure)/65.1/11.8 (expressed as pure diperketal), at an overall concentration of peroxides making it possible to reach $T_{max}$ at around 250° C., with an initiation temperature of 145° C.

Reference Polymerization for Example 9

The results observed are as follows:
Total ppm weight 48.4 (pure peroxides involved)
Maximum temperature reached: 250° C.
Time taken to reach the maximum temperature: 14 s
Conversion: 15.32%
Overall CS in pure peroxides=0.316 g/kg
Amount of LDPE produced: 34.5 g This polymerization was then compared to that carried out with the cocktail of peroxides described in the following example:

Example 9b

Polymerization according to the invention, of example 9: polymerization with cocktail of peroxides as for the reference for example 9, but for which approximately a molar third of the perketal 2,2-(di-tert-amylperoxy)butane has been replaced with approximately a molar third of the diperketal 2,2-(di-tert-amylperoxy)propane:

The procedure described in example 1 is reproduced with the following composition of the injected cocktail: Luperox® 11M75/Luperox® 26/Luperox® 520M50 (tert-butyl peroxypivalate/tert-butyl peroxy-2-ethylhexanoate/2,2-(di-tert-amylperoxy)butane)/2,2-(di-tert-amylperoxy)propane) in the molar ratio 23 (pure)/65.4/8/3.6, respectively, the two last diperketal peroxides being expressed as pure although they are involved in the form of 50% dilution in isododecane.

The results observed are as follows:
Total ppm weight 51.55 (pure peroxides involved)
Maximum temperature reached: 251° C.
Time taken to reach the maximum temperature: 13.5 s
Conversion: 16.83%
Overall CS in pure peroxides=0.306 g/kg
Amount of LDPE produced: 37.9 g Example 9b shows that the use of 2,2-(di-tert-amylperoxy)propane as replacement for approximately a molar third of the 2,2-(di-tert-amylperoxy)butane in a polymerization initiated by a ternary cocktail composed of peresters and a high-productivity diperketal peroxide initiator such as 2,2-(di-tert-amylperoxy)butane makes it possible to increase the conversion by more than 1.5%, while conserving kinetics, whereas example 7 shows that the total substitution of 2,2-(di-tert-amylperoxy)butane by 2,2-(di-tert-amylperoxy) propane leads to an extension of the polymerization reaction which is unacceptable in terms of production. Example 9b therefore illustrates the advantage of introducing a non-predominant proportion of the perketal 2,2-(di-tert-amylperoxy)propane with the diperketal 2,2-(di-tert-amylperoxy) butane in a cocktail of initiators containing perester and diperketal components.

Example 9c

Polymerization according to the invention, of example 9: polymerization with cocktail of peroxides as for the reference for example 9, but for which approximately 12 mol % of the perketal 2,2-(di-tert-amylperoxy)butane has been replaced with approximately 12 mol % of the diperketal 2,2-(di-tert-amylperoxy)propane:

The procedure described in example 1 is reproduced with the following cocktail: Luperox® 11/Luperox® 26/diperketal 2,2-(di-tert-amylperoxy)butane/diperketal 2,2-(di-tert-amylperoxy)propane in the molar ratio 22.8 (pure)/64.7/11/1.5, respectively, the two last diperketal peroxides being expressed as pure although they are involved in the form of 50% dilution in isododecane.

The results observed are as follows:
Total ppm weight 60.23 (pure peroxides involved)
Maximum temperature reached: 249° C.
Time taken to reach the maximum temperature: 14 s
Conversion: 15.81%
Overall CS in pure peroxides=0.311 g/kg
Amount of LDPE produced: 35.6 g Example 9c again shows the advantage of introducing a non-predominant proportion of the diperketal 2,2-(di-tert-amylperoxy)propane with the diperketal 2,2-(di-tert-amylperoxy)butane in a cocktail of initiators containing perester and diperketal components.

Although the gain in conversion and in production of resin is less than that shown for example 9b, example 9c, with 12 mol % instead of approximately 30 mol % of 2,2-(di-tert-amylperoxy)propane used together with 2,2-(di-tert-amylperoxy)-butane further enables a gain in conversion of the order of a half percent conversion.

The invention claimed is:

1. A process for manufacturing polyethylene or an ethylene copolymer, comprising radical polymerization or copolymerization of ethylene in the presence:
of a first peroxide polymerization initiator chosen from the diperketal peroxide compounds of formula:

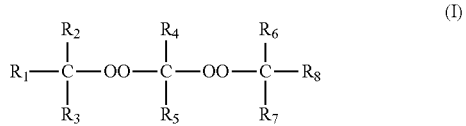

(I)

wherein the $R_1$, $R_2$, $R_3$, $R_6$, $R_7$ and $R_8$ groups comprise substituted or unsubstituted, linear, branched or cyclic C1-C10 alkyl groups, and
of a second initiator, other than said first initiator, also comprising a diperketal peroxide of formula (I).

2. The process as claimed in claim 1, wherein the one minute half-life temperature of said first initiator is between 140° C. and 180° C.

3. The process as claimed in claim 1, wherein the one minute half-life temperature of said second initiator is between 150° C. and 185° C.

4. The process as claimed in claim 1, wherein the radical polymerization or copolymerization is carried out at a pressure varying between 500 and 3500 bar.

5. The process as claimed in claim 1, wherein radical polymerization or copolymerization is carried out at a temperature of between 100° C. and 330° C.

6. The process as claimed in claim 1, wherein the group $R_4$ or $R_5$ of the first initiator differs from the corresponding group, $R_4$ or $R_5$, of the second initiator, by a single carbon.

7. The process as claimed in claim 1, wherein the groups $R_4$ and $R_5$ are C1-C6 alkyl groups.

8. The process as claimed in claim 1, wherein the groups $R_2$, $R_3$, $R_6$ and $R_7$ of the two abovementioned initiators each comprise a methyl group.

9. The process as claimed in claim 1, wherein the groups $R_1$ and $R_8$ of the two abovementioned initiators each comprise a C2-C5 alkyl group.

10. The process as claimed in claim 1, wherein the group R5 of the two abovementioned initiators represents a C1-C2 alkyl group.

11. The process as claimed in claim 1, wherein the first initiator is 2,2-di(tert-amylperoxy)butane.

12. The process as claimed in claim 1, wherein the second initiator is 2,2-di(tert-amylperoxy)propane.

13. The process as claimed in claim 1, wherein a mixture of the two diperketal peroxides has an amount of the second initiator of between 2 and 50 mol %.

14. The process as claimed in claim 1, wherein the polymerization or copolymerization is carried out in the presence of one or more additional peroxide initiator(s).

15. The process as claimed in claim 1, wherein the polymerization or copolymerization is carried out in the presence of at least one additive selected from the group consisting of: antioxidants; UV protection agents; processing agents; antifogging agents; antiblocking agents; fillers; coupling agents; crosslinking agents; antistatic agents; nucleating agents; pigments; dyes; plasticizers; fluidizers and flame-retardant additives.

16. The process as claimed in claim 4, wherein the radical polymerization or copolymerization is carried out at a pressure varying between 1200 to 2600 bar.

17. The process as claimed in claim 5, wherein radical polymerization or copolymerization is carried out at a temperature of between 140° C. and 200° C.

18. The process as claimed in claim 8, wherein the R4 group comprises a methyl group.

* * * * *